Sept. 20, 1966     I. F. FAUSEK ETAL     3,273,587
LAGER VALVE

Filed Dec. 26, 1963     2 Sheets-Sheet 1

INVENTORS.
IRWING F. FAUSEK
ROBERT F. LAMPING

BY

ATTORNEY.

Sept. 20, 1966  I. F. FAUSEK ETAL  3,273,587
LAGER VALVE
Filed Dec. 26, 1963   2 Sheets-Sheet 2
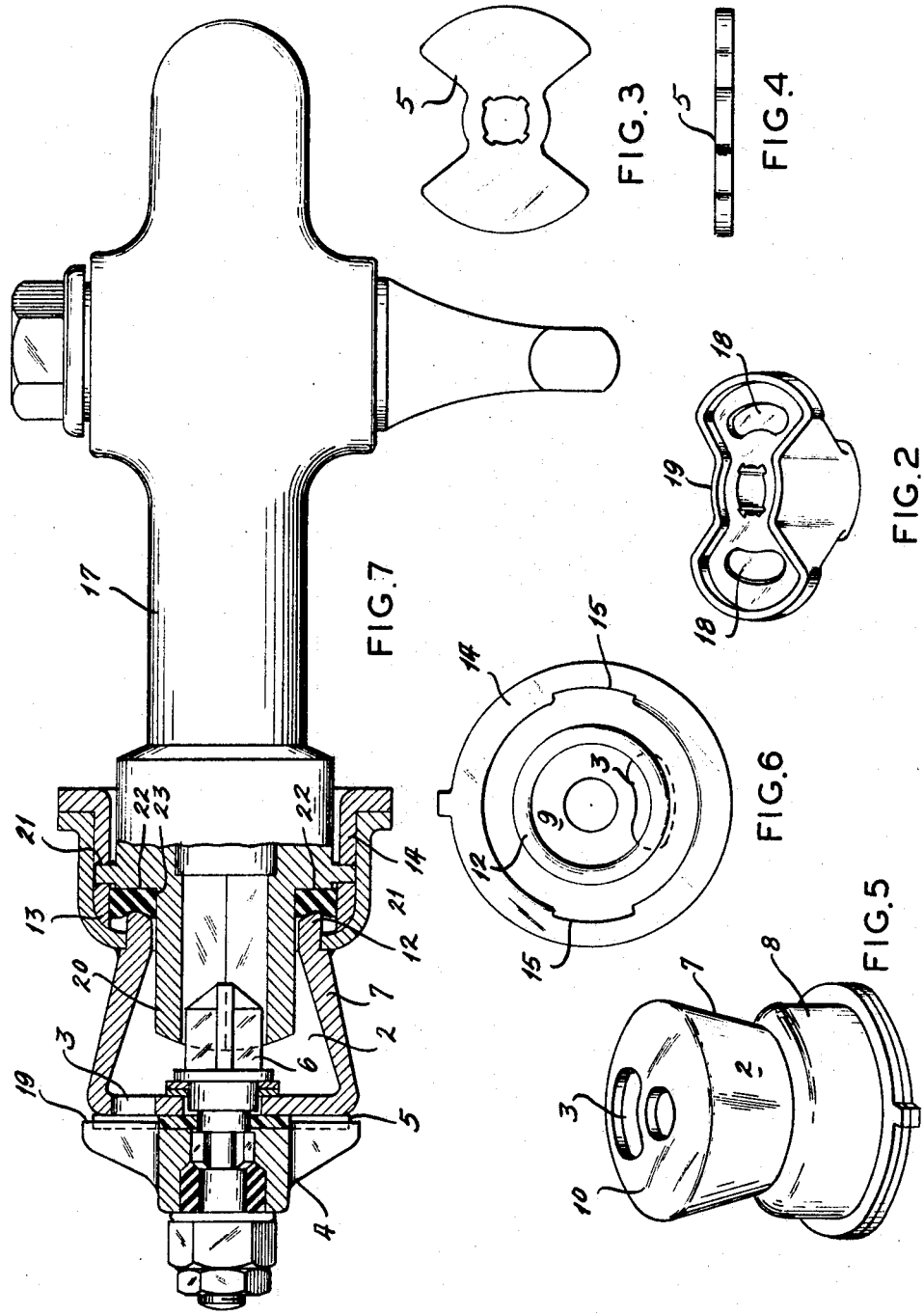

United States Patent Office 3,273,587
Patented Sept. 20, 1966

3,273,587
LAGER VALVE
Irwing F. Fausek, Clayton, and Robert F. Lamping, St. Louis County, Mo., assignors to Modern Engineering Company, St. Louis, Mo., a corporation of Missouri
Filed Dec. 26, 1963, Ser. No. 333,487
6 Claims. (Cl. 137—323)

This invention relates generally to lager valves of the general type disclosed in U.S. Patents Nos. 2,195,643, and 2,262,929, granted to A. J. Fausek et al., and relates primarily to prolonging the life and maintaining the efficiency of sealing members used in such valves.

Valves of the character referred to are commonly employed in beer barrels, kegs, and casks, for sealing such containers after they are charged and until they are tapped, and for excluding dirt and other foreign matter from such containers after they are emptied. Customarily, such valves are two-position valves, which is to say that, save for movement between opening and closing, or vice versa, they are either fully open or fully closed, and to effectuate this result, they are conventionally manipulated between open and closed positions by a tap which is removably received within the body of the valve, and when turned for, say, a quarter of a turn, simultaneously seals itself within the body of the valve and moves the valve operating parts to a position where the orifice is fully open. Conversely, when the tap is removed, it must first be turned backwardly to simultaneously close the orifice and unseal the tap from the valve body.

In valves of the character referred to, the valve body is conventionally a cup-shaped metal part having an eccentric opening in the bottom wall which provides the orifice through which the beer is to flow, either in charging or discharging. The bottom wall of such body is on the interior of the beer container, as are the portions of the body which surround said bottom wall, but the cup-shaped cavity in such valve body is open at the exterior of the container. On the beer side of such valve body, there is usually mounted a "butterfly" manipulatable from within the body (i.e., from the exterior of the container), so as to cover or uncover the orifice in the bottom of the valve body.

In valves of this type, sealing problems present themselves at two different locations. One of these locations is between the "butterfly" and the area surrounding the orifice in the bottom of the body; the other location is between the tap and the interior of the body. In each of these locations, a sealing member is conventionally provided. A variety of materials have been used for such sealing members. Until recent years, rubber and rubber-like materials were largely employed, but, more recently, synthetic materials having less resilience and less porosity than the materials previously employed have come into vogue. Among the latter is a material known commercially as "Teflon," which is polytetrafluoroethylene. However, Teflon seals have been found to have a disadvantage which not only renders the manipulation of the "butterfly" more difficult, but requires more frequent replacement of the seal than is desirable. When Teflon is subjected to mechanical pressure, it tends to flow, and in the case of a Teflon seal between the "butterfly" and the seat area surrounding the orifice in the bottom of the valve body, it has been observed that when the valve remains closed for substantial periods, the Teflon tends to cold flow into the orifice, thus creating a bump on the surface of the seal which interferes with the operation of the valve.

On the interior of the valve body, it has heretofore been customary to provide an annular seat against which an annular gasket is compressed in the process of inserting and turning the tap to open the valve. While the lager valve is open, flow is controlled by a manual valve in the tap, but the seal within the valve body continues to be subjected not only to mechanical pressure, but also to the pressure of the beer within the container whether or not there is flow through the tap. When the gasket within the valve body is subjected to such pressures for prolonged periods of time, the gasket tends to relieve itself of the mechanical pressure and leakage may develop due to cold flow of the gasket material.

The object of the invention, generally stated, is to reduce the tendency of the sealing material in such valves to cold flow.

Another object of the present invention is to overcome the difficulties aforesaid, and to provide improved sealing means both about the orifice in the bottom of the valve body and between the interior of a valve body and a removable tap.

Another object of the invention is to provide a seal retainer entrapped within the valve body for cooperation with the seal between the tap and the interior of the body.

In accordance with the present invention, the sealing member (which operates against the seat surrounding the orifice in the valve body) is relieved of the direct application of mechanical pressure by the "butterfly" at the area on the "butterfly" side of the seal which aligns with the orifice in the valve body when the valve is closed. Such relief of mechanical pressure can be accomplished by providing a cavity either in the face of the seal member which is contiguous with the "butterfly," or in the face of the "butterfly" which is contiguous with the seal member. Such a cavity is preferably of size and shape substantially corresponding with that of the orifice, and so located as to be in alignment with the orifice when the valve is in its closed position.

The invention further contemplates the provision of a seal confining ring disposed within the valve body, so as to limit expansion, in the radial direction, of an annular gasket or seal between the tap and the body when said seal is compressed in the axial direction. Such a ring may be either permanently secured within the valve body, or floatingly entrapped therein, but, in either event, is so arranged as to radially confine the seal.

Reference may now be had to the accompanying drawings for an illustrative embodiment of the invention. In the drawings:

FIGURE 2 is a perspective view of the "butterfly" or seal holder;

FIGURE 3 is a plan view of the lager valve seal;

FIGURE 4 is a view in side elevation of the lager valve seal;

FIGURE 5 is a perspective view of the valve body, as seen from within the container, and showing the seal seat surface surrounding the orifice;

FIGURE 6 is a top or exterior plan view of the valve body; and

FIGURE 7 is a plan view, partly in section, of a lager valve and tap assembly shown in the valve-open position.

Figure 1:
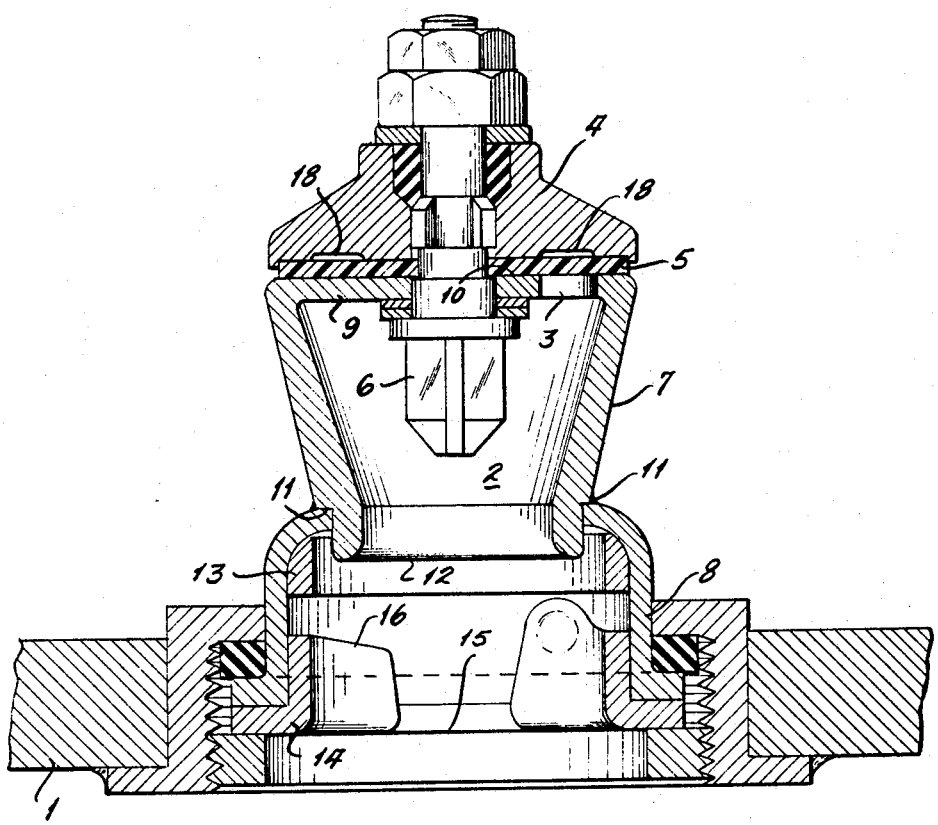
FIGURE 1 is an axial sectional view of a lager valve constructed in accordance with the invention, as mounted in a beer barrel, and showing the parts in the positions occupied by them when the tap is not attached—i.e., the lager valve-closed position.

Referring now to the drawings, the beer barrel 1 has connected thereto, in the usual manner, a valve assembly which consists of a composite body 2 having an orifice 3, a "butterfly" or seal holder 4, a seal 5, and a "butterfly" operator 6. The valve body 2, with its adjunct parts, is connected at the bung of the barrel 1 in any suitable well-known manner, so that stem 6 is accessible from the exterior of the barrel and "butterfly" 4 is exposed on the interior of the barrel.

In the embodiment shown, the valve body 2 is a composite including a conical part 7 and a bowl part 8. The conical part 7 has a bottom 9 in which the orifice 3 is located eccentrically. The exterior surface (i.e., within the barrel 1) of bottom 9 provides a valve seat surface 10. The conical part 7 may be, and preferably is, a stamping which is deformed to constrict it, and then machined at its constricted end to provide a shoulder 11 and an annular tap gasket seat 12. The bowl-shaped part 8 has an open bottom, and is interfitted with the constricted end of conical part 7, and preferably welded thereto at shoulder 11.

Within the curved portion of bowl 8, there is provided a metallic ring 13 whose contour substantially fits the interior contour at the curved portion of the bowl 8. The ring 13 may be, and preferably is, loose within the bowl, but, if desired, can be welded either continuously or tacked in a fixed location as shown. At the outer mouth of bowl 8, there is provided a cam sleeve 14, which fits within bowl 8 and overlaps the exterior margin thereof. The cam sleeve is appropriately secured, as by tack welding, to bowl 8. The cam sleeve 14 is conventional, and, as best shown in FIGURE 6, has its interior wall cut out at diametrically opposite locations to provide keyways 15 from adjacent which the interior walls slope as shown at 16 to provide a cam surface which, upon insertion and turning of the tap 17, drives the tap toward operating stem 6, as well known in the art.

As indicated hereinbefore, the present invention contemplates relieving the seal 5 from mechanical pressure exerted by "butterfly" 4 when the "butterfly" is in the valve closed position shown in FIGURE 1. This is preferably accomplished by providing the "butterfly" with a recess 18 of substantially the same size and shape as orifice 3. The recess 18 need only be of depth sufficient to prevent the transfer of mechanical force from "butterfly" 4 to those increments of seal 5 which lie between the recess and orifice 3 when the valve is in closed position, and, for practical purposes, such recess need not be more than about five thousandths of an inch deep. The elimination of such mechanical pressures on the seal 5, at the locale therein whose opposite side is covering orifice 3, substantially eliminates the tendency of the seal material to flow into the orifice. In the embodiment shown, the "butterfly" 4 is provided with two such recesses 18, but it will be understood that, at any given time, only one of them is in position over orifice 3, unless there be two such orifices. However, if and when desired, the position of the "butterfly" relative to orifice 3 may be reversed, and thus bring into use the side thereof which theretofore had been idle. Seal member 5 is retained in fixed position on "butterfly" 4 by a continuous flange 19 which overhangs the margin of the seal member 5 substantially as shown in the aforesaid Patent No. 2,195,643; and the "butterfly" is mounted on stem 6 which extends through a central opening in bottom 9 substantially as shown in the said patent.

As shown in FIGURE 7, the tap 17 has a skirt 20 whose interior configuration is such as to interlock with the part of stem 6 which extends up inside the valve body 2, so that the tap constitutes a removable handle for manipulating stem 6 and valve seat holder 4. The tap 17 is also provided with a pair of opposite lugs 21 which enter the keyways 15 and ride upon cam surface 16, in order to force the tap inwardly as it is turned in the process of moving stem 6 and its adjunct parts. At the base of the skirt 20, there is an annular shoulder 22 upon which is mounted an annular gasket 23, which is compressed against the annular seat 12 as the tap is cammed in toward stem 6. The exterior periphery of gasket 23 is of a diameter substantially the same as, but not in excess of, the inside diameter of ring 13, so that any tendency for gasket 23 to expand radially is limited by the inner periphery of ring 13. Consequently, when the tap is driven home and the lager valve opened, gasket 23 is placed under axial compression against seat 12, and the tendency of the gasket material to relax such compression by radial migration is limited by ring 13.

From the foregoing description, those skilled in the art should readily understand the construction and operation of the invention and realize that it accomplishes the objects aforesaid. While one complete embodiment of the invention has been disclosed in detail, it is to be distinctly understood that the invention is not limited to the details of the foregoing disclosure, but, on the contrary, such modifications and variations thereof as may suggest themselves to those skilled in the art, without departing from the spirit of the invention, are contemplated by and within the scope of the appended claims.

Having thus described the invention, what is claimed and desired to be secured by Letters Patent is:

1. In a lager valve of the character described having a valve seat, one side of which is exposed to high pressure and the other side to low pressure, said seat having an eccentric opening therethrough for the passage of fluid; a seal member mounted in contact with the high pressure side of said seat to rotate about an axis substantially centrally of said seat, said seal having at least one area which when aligned with said eccentric opening closes the latter; and a seal-holder relatively stiffer than said seal interlocked with said seal to rotate therewith, the improvement which comprises: said seal-holder having a face contiguous with the surface of said seal opposite that which is in contact with said seat, and said face being recessed in alignment with said eccentric opening.

2. The improvement of claim 1 wherein the seal-holder has a marginal flange the inner periphery of which mates with and overhangs the outer periphery of said seal.

3. In a lager valve of the character described having a valve seat, one side of which is exposed to high pressure and the other side to low pressure, said seat having an eccentric opening therethrough for the passage of fluid; a seal member having an acircular periphery and composed of polytetrafluoroethylene, said seal member being mounted in contact with the high pressure side of said seat to rotate about an axis substantially centrally of said seat, said seal member being contoured to have at least one portion at which its periphery is less distant from said axis than is said eccentric opening in the seat so that when said portion is aligned with said eccentric opening leaves the latter substantially uncovered by said seal, and at least one other area which when aligned with said eccentric opening closes the latter; and a seal-holder relatively stiffer than said seal member interlocked with said seal member to rotate therewith, the improvement which comprises: said seal-holder having a face contiguous with the surface of said seal member opposite that which is in contact with said seat, and said seal-holder having a marginal flange the inner periphery of which mates with and axially overhangs the outer periphery of said seal member whereby to restrain radial cold flow of said seal member.

4. In a lager valve having a stationary orifice surrounded by a seat area, a seal-holder cooperating with and movable relative to said orifice between a position whereat said orifice is closed and a position whereat said orifice is open, a seal movable with said seal-holder and maintained in contact with said seat during such movement; the improvement which comprises, a cavity between said seal-holder and seal at the location which is aligned with said orifice when the valve is in its closed position.

5. A lager valve comprising, in combination a valve body having an orifice in one end, a cam member at the other end, an annular ridged seat between said cam member and said orifice, a flat valve seat adjacent said orifice, a seal member on said seat, a movable seal-holder retaining said seal member in relatively fixed position thereon, said seal-holder and seal having an open area movable into alignment with said orifice to open the valve and a sealing area movable into alignment with said orifice to close the valve, with the seal member in contiguity with the valve seat, one of said seal and said seal-holders being relieved at the interface between them over an area substantially corresponding to the size and shape of said orifice and at the location which is aligned with said orifice when the valve is in closed position, a tap for manipulating said seal-holder and seal between open and closed positions, an annular gasket compressed between said ridged seat and a portion of said tap inwardly of said cam member, and a metallic ring circumferentially confining said gasket.

6. A lager valve having a cup-shaped valve body with an open mouth, a ported base, an annular ridged seat lying substantially in a plane parallel with and between said mouth and said base, a cam sleeve mounted within said body adjacent the mouth thereof and in axially spaced relation from said annular ridged seat, said cam sleeve being adapted to receive and drive a protuberance on a tap axially into the space between said cam sleeve and said annular ridged seat, said protuberance extending radially for a distance greater than the inside radius of said cam sleeve, and a tap gasket confining ring substantially concentrically surrounding said annular ridged seat, said confining ring having an inside circumference greater than said annular ridged seat but no greater than said cam sleeve.

References Cited by the Examiner
UNITED STATES PATENTS

| | | | |
|---|---|---|---|
| 2,525,799 | 10/1950 | Hecker | 251—363 |
| 2,567,527 | 9/1951 | Parks | 251—214 |
| 3,115,149 | 12/1963 | Tonna et al. | 137—323 |
| 3,152,205 | 10/1964 | Sinkler | 251—317 |

WILLIAM F. O'DEA, *Primary Examiner.*

ISADOR WEIL, *Examiner.*

D. MATTHEWS, *Assistant Examiner.*